Dec. 6, 1932.  C. B. CLARK  1,889,949
CONCENTRATION OF WEAK PHOSPHORIC ACID
Filed Feb. 11, 1930
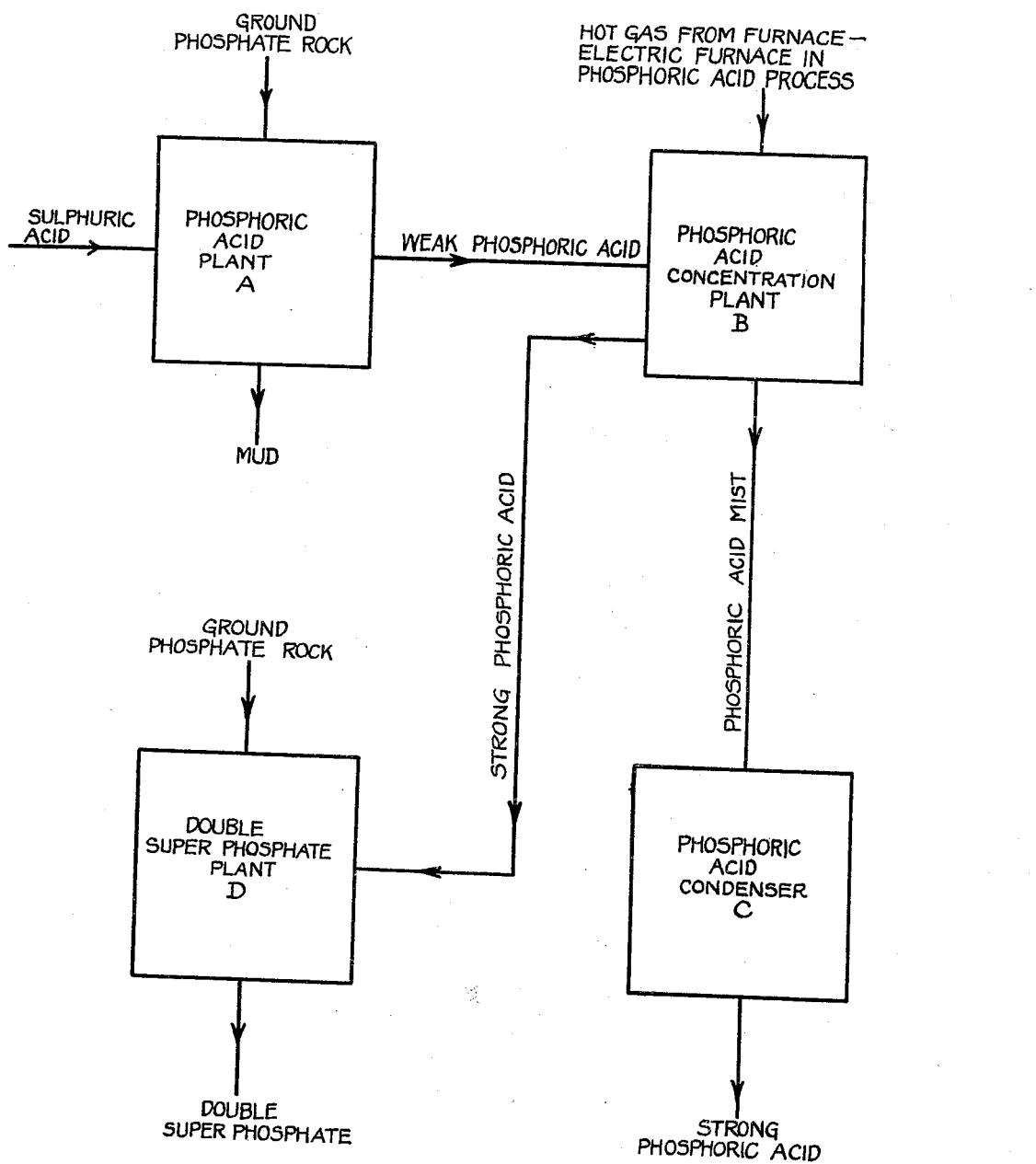

Patented Dec. 6, 1932

1,889,949

UNITED STATES PATENT OFFICE

CYRIL B. CLARK, OF SCARSDALE, NEW YORK, ASSIGNOR TO AMERICAN CYANAMID COMPANY, OF NEW YORK, N. Y., A CORPORATION OF MAINE

CONCENTRATION OF WEAK PHOSPHORIC ACID

Application filed February 11, 1930. Serial No. 427,456.

My invention resides in a new and improved process for the concentration of weak phosphoric acid, and more specifically covers a process in which the water required for producing phosphoric acid from the electric furnace process is supplied by water derived from weak phosphoric acid produced from the sulphuric acid process.

In the electric furnace process for producing phosphoric acid, gas containing phosphorus pentoxide ($P_2O_5$) is cooled, the oxide being hydrated with water whereby a strong phosphoric acid is produced directly without concentration. This is one of the chief advantages of the electric furnace process.

In the sulphuric acid process for producing phosphoric acid, a weak phosphoric acid is produced and then this acid must be concentrated when it is used, for example, in making double super-phosphate for fertilizer. This is one of the chief drawbacks of this sulphuric acid process, since the cost of concentrating the phosphoric acid offsets to a considerable extent, the advantage which this process would otherwise enjoy over the electric furnace process.

My improved process depends upon the operation of an electric furnace phosphoric acid process operated in conjunction with a sulphuric acid process. The weak phosphoric acid from the sulphuric acid process is used to scrub the gases from the electric furnace process, thus hydrating and cooling the gases, and at the same time concentrating the weak phosphoric acid to a point where it is suitable for the manufacture of double super-phosphates.

According to my improved process some phosphoric acid from the gas will be condensed in the scrubbing tower, but most of it will pass through the scrubber as a mist requiring mechanical filtration or electrical precipitation for proper condensation. My improved process may be diagrammatically illustrated by reference to accompanying drawing.

I introduce ground phosphate rock and 30° Bé. sulphuric acid into the phosphoric acid plant A and obtain weak phosphoric acid and a mud which is discarded. If about 64 lbs. of phosphate rock containing 35% $P_2O_5$ is treated with 145 lbs. of 30° Bé. sulphuric acid, it will produce about 100 lbs. of phosphoric acid containing 20 lbs. of $P_2O_5$ and 80 lbs. of water.

I then pass the weak phosphoric acid so produced to the concentration plant B where it is contacted in a tower with the hot gas containing phosphorus and carbon monoxide from an electric furnace used to produce phosphoric acid by the electric furnace process, and in which the phosphorus has been oxidized to phosphorus pentoxide ($P_2O_5$). The $P_2O_5$ combines in the concentration plant B with water derived from the weak phosphoric acid forming a $H_3PO_4$ mist which passes on to the phosphoric acid condensing plant C. The formation of phosphoric acid mist and the dehydration of the weak phosphoric acid are assisted by the heat carried into the plant B by the furnace gas and also from the hydration of the $P_2O_5$.

The phosphoric acid mist is then condensed in the condensing plant C which may be of the usual type, either a mechanical filter or an electrical precipitator.

The strong phosphoric acid produced in the concentrator B is then passed to the double superphosphate plant D where it is used in treating ground phosphate rock to produce double superphosphate.

In my process hereinbefore-described, the water which was formerly added to the $P_2O_5$ before condensation is now supplied by dehydration of the weak phosphoric acid.

One advantage of this system just described is that a simple and inexpensive method is provided for concentrating the weak phosphoric acid with heat that would otherwise be wasted. A second advantage lies in the electric phosphoric acid process itself since the gases from the electric furnace contain impurities which ordinarily are condensed in the product. By scrubbing these gases with weak acid, a considerable portion of these impurities are removed in acid already impure, and by this method the steps ordinarily required for the purification of the acid are simplified and reduced.

I claim as my invention:—

1. In a process for concentrating weak phosphoric acid evolved from treating natural phosphates with sulphuric acid, the step which comprises dehydrating the weak phosphoric acid by scrubbing with a heated gas containing phosphorus pentoxide while removing impurities from the gas during the scrubbing and condensing the phosphoric acid mist formed as a result of the scrubbing action by dry condensation to concentrated phosphoric acid.

2. A process for producing concentrated phosphoric acid which comprises scrubbing hot gas from an electric furnace phosphoric acid process containing phosphorus pentoxide and impurities with weak phosphoric acid to concentrate said acid and to remove the impurities from the gas, and condensing the phosphoric acid mist produced as a result of the scrubbing operation by dry condensation to a concentrated phosphoric acid.

3. A process for the production of concentrated phosphoric acid which comprises contacting weak phosphoric acid with hot gases containing phosphorus pentoxide, whereby the weak acid is concentrated, conducting the phosphoric acid mist formed as a result of the scrubbing operation away from the scrubbing liquid and thereafter condensing said mist by electrical precipitation to concentrated phosphoric acid.

4. A method of producing pure concentrated phosphoric acid which consists in scrubbing hot gases from an electric furnace phosphoric acid process containing phosphorus pentoxide and impurities, with a weak phosphoric acid, conducting the phosphoric acid mist produced as a result of the scrubbing step and free of its impurities to a point remote from the scrubbing liquid, and then dry condensing said mist to a pure concentrated phosphoric acid.

CYRIL B. CLARK.